United States Patent
Dejolier

(10) Patent No.: US 7,390,446 B2
(45) Date of Patent: Jun. 24, 2008

(54) FOAMED SUPRAMOLECULAR POLYMERS

(75) Inventor: Bruno Dejolier, St-Stevens Woluwe (BE)

(73) Assignee: Huntsman International LLC, Salt Lake City, UT (US)

( * ) Notice: Subject to any disclaimer, the term of this patent is extended or adjusted under 35 U.S.C. 154(b) by 590 days.

(21) Appl. No.: 10/997,144

(22) Filed: Nov. 24, 2004

(65) Prior Publication Data

US 2005/0151291 A1     Jul. 14, 2005

Related U.S. Application Data

(63) Continuation of application No. PCT/EP03/04621, filed on May 2, 2003.

(30) Foreign Application Priority Data

May 27, 2002   (EP)  ................... 02011736

(51) Int. Cl.
    *B29C 44/02*    (2006.01)
(52) U.S. Cl. .......................... 264/53; 264/54
(58) Field of Classification Search ............ 264/53, 264/54; 521/155, 94; 528/423
See application file for complete search history.

(56) References Cited

U.S. PATENT DOCUMENTS

| 4,588,542 | A  | * | 5/1986  | Pierce .................. 264/45.5 |
| 6,320,018 | B1 | * | 11/2001 | Sijbesma et al. ........... 528/310 |
| 6,472,442 | B1 | * | 10/2002 | Masubuchi ................ 521/51 |
| 6,803,447 | B2 | * | 10/2004 | Janssen et al. ............. 528/423 |

FOREIGN PATENT DOCUMENTS

| EP | 1 213 309   | 6/2002  |
| GB | 1 550 235   | 8/1979  |
| WO | WO 97/46607 | 12/1997 |
| WO | WO 02/46260 | 6/2002  |

OTHER PUBLICATIONS

R.P. Sijbesma, et al., "Reversible Polymers Formed from Self-Complementary Monomers Using Quadruple Hydrogen Bonding", Science, vol. 278, p. 1601-1604, Nov. 28, 1997.

Brigitte J.B. Folmer, "New Polymers Based on the Quadruple Hydrogen Bonding Motif", Ph.D. Thesis, Technische Universiteit Eindhoven, 2000, p. 91-108.

* cited by examiner

*Primary Examiner*—Christina Johnson
(74) *Attorney, Agent, or Firm*—Ron D. Brown; Rhonda L. Sheldon

(57) ABSTRACT

Process for the preparation of foamed supramolecular polymers characterized in that the foaming of the supramolecular polymer is carried out in the presence of blowing agents.

9 Claims, No Drawings

FOAMED SUPRAMOLECULAR POLYMERS

CROSS REFERENCE TO RELATED APPLICATIONS

This application is a continuation of international application PCT/EP03/04621, filed May 2, 2003, and claims priority to EP 02011736.2, filed May 27, 2002.

FIELD OF THE INVENTION

The present invention is concerned with a process for the preparation of foamed supramolecular polymers, novel foamed supramolecular polymers, and reaction systems for preparing foamed supramolecular polymers.

BACKGROUND OF THE INVENTION

It is known for several years that supramolecular polymers are polymers in which the monomers are at least in part bond to one another via H-bridges.

When the monomer units have a low molecular weight, they form at low temperature a rigid dimensionally stable polymer. At higher temperatures, however, since the H-bridges are much weaker, essentially only monomeric units are present and can be easily handled.

International Patent Application No. WO 97/46607 relates to a supramolecular polymer containing monomeric units that form H-bridges with one another, the H-bridge-forming monomeric units in pairs forming at least 4-H-bridges with one another. As H-bridge-forming monomeric units, substituted ureido-pyrimidones and ureido-pyrimidines were used. In examples XII and XIII of that International Patent Application is described the end-capping of polydimethyltrisiloxanes with 4-benzyloxy-6-(3-butenyl)-2-butylureidopyrimidine and 6-(3-butenyl)-2-butylureido-4-pyrimidone, respectively.

Supramolecular polymers have also been described in our co-pending PCT application PCT/EP01/14082.

In "Reversible Polymers Formed from Self-Complementary Monomers Using Quadruple Hydrogen Bonding", by R. P. Sijbesma, H. B. Beijer, L. Brunsveld, B. J. B. Folmer, J. H. K. Ky Hirschberg, R. F. M. Lange, J. K. L. Lowe, E. W. Meijer, published in Science, Vol. 278, 28 Nov. 1997, is described in FIG. 2 the reaction of 6-tridecylisocytosine with hexanediisocyanate to give a bifunctional compound (2a) which forms reversible polymers. In FIG. 6 of that reference is also disclosed the functionalization of a trifunctional copolymer of propylene oxide and ethylene oxide with a diisocyanate, followed by a reaction with methylisocytosine to give a compound (7) which has the ability to form reversible polymer networks. These compounds (2a) and (7) are supposed to allow the formation of polymer networks that can be used in hot melts and coatings. However, as indicated in the reference, compound (2a) has a tendency to crystallise and compound (7) exhibits poor mechanical properties.

In "New Polymers Based on the Quadruple Hydrogen Bonding Motif", by Brigitte J. B. Folmer, pages 91-108, PhD Thesis, Technische Universiteit Eindhoven, 2000, is described (see in particular page 96) the end-capping of hydroxy terminated polymers with a reactive synthon obtained by the reaction of methylisocytosine with 1,6-hexanediisocyanate. The hydroxy terminated polymers are a hydrogenated polybutadiene, a polyether, a polycarbonate and a polyester.

As a result of the increased demand for lighter thermoplastic materials, a low density TPU needs to be developed which, in turn, represents a big technical challenge to provide, at minimum, equal physical properties to conventional low density PU.

It is already known to produce soles and other parts of polyurethane by a polyaddition reaction of liquid reactants resulting in an elastic solid moulded body. Up till now, the reactants used were polyisocyanates and polyesters or polyethers containing OH-groups. Foaming was effected by adding a liquid of low boiling point or by means of $CO_2$, thereby obtaining a foam at least partially comprising open cells.

Reducing the weight of the materials by foaming the TPU has not given satisfactory results up to now. Attempts to foam TPU using well-known blowing agents as azodicarbonamides (exothermic) or sodiumhydrocarbonate (endothermic) based-products were not successful for mouldings with reduced densities below 800 $kg/m^3$.

With endothermic blowing agents, a good surface finish can be obtained but the lowest density achievable is about 800 $kg/m^3$. Also, the processing is not very consistent and results in long demoulding times. Very little or no foaming is obtained at the mould surface due to a relatively low mould temperature, resulting in a compact, rather thick skin and a coarse cell core.

By using exothermic blowing agents, a lower density foam (down to 750 $kg/m^3$) with very fine cell structure can be achieved but the surface finish is not acceptable for most applications and demould time is even longer.

From the above it is clear that there is a continuous demand for low density TPUs having improved skin quality which can be produced with reduced demould times.

It has now been surprisingly found that foaming supramolecular polymers with a PU backbone structure in the presence of blowing agents, allows one to meet the above objectives. Demould times are significantly reduced and the process can be carried out at lower temperatures, resulting in a better barrel stability. In addition, the use of blowing agents, even allows to further reduce the density while maintaining or improving the skin quality and demould time. Alternatively, the efficiency of the blowing agents, when combined with the supramolecular polymer is improved.

The present invention thus concerns a process for the preparation of foamed supramolecular polymers whereby the foaming of the supramolecular polymer is carried out in the presence of blowing agents.

The low density supramolecular polymers thus obtained (density not more than 800 $kg/m^3$) have a fine cell structure, very good surface appearance, a relatively thin skin and show comparable physical properties to conventional PU which renders them suitable for a wide variety of applications.

The invention provides TPU products having outstanding low temperature dynamic flex properties and green strength at the time of demould, at density 800 $kg/m^3$ and below.

The term "green strength", as is known in the art, denotes the basic integrity and strength of the TPU at demould. The polymer skin of a moulded item, for example, a shoe sole and other moulded articles, should possess sufficient tensile strength and elongation and tear strength to survive a 90 to 180 degree bend without exhibiting surface cracks. The prior art processes often require 5 minutes minimum demould time to attain this characteristic.

In addition, the present invention therefore provides a significant improvement in minimum demould time. That is to say, a demould time of 2 to 3 minutes is achievable.

Adding blowing agents during the processing of TPUs is widely known, see e.g. WO-A 94/20568, which discusses the production of foamed TPUs, in particular expandable, particulate TPUs, EP-A 516024, which describes the production of foamed sheets from TPU by mixing with a blowing agent and heat-processing in an extruder, and DE-A 4015714, which concerns glass-fibre reinforced TPUs made by injection moulding TPU mixed with a blowing agent.

The use of microspheres in a polyurethane foam has been described in EP-A 29021 and U.S. Pat. No. 5,418,257.

Nevertheless, none of the prior art documents discloses the use of a combination of a supramolecular polymer and blowing agents to produce foamed low density TPU (density 800 kg/m$^3$ and even below) nor do these documents suggest the benefits associated with the present invention including the skin quality and thereby maintaining physical properties at low density.

SUMMARY OF THE INVENTION

The present invention concerns a process for the preparation of foamed supramolecular polymers whereby the foaming of the supramolecular polymer is carried out in the presence of blowing agents. The low density supramolecular polymers thus obtained (density not more than 800 kg/m$^3$) have a fine cell structure, very good surface appearance, a relatively thin skin and show comparable physical properties to conventional PU which renders them suitable for a wide variety of applications.

DETAILED DESCRIPTION

The polymer of the invention has the following general formula:

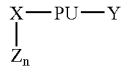

where
PU is a polymer chain comprising at least one polyurethane chain;
n ranges from 0 to 8; and
X, Y and Z are identical or different and are H-bonding sites.

Polyurethane Chain PU

According to the invention, the polymer chain PU comprises at least one polyurethane chain. According to one embodiment, the PU is thermoplastic and/or elastomeric. According to another embodiment, the polyurethane chain preferably comprises at least one soft block and at least two hard blocks. The soft and hard blocks are according to the common general knowledge in the art.

The polyurethane chain may have a molecular weight (MWn) ranging between large limits. The molecular weight is calculated according to the Dryadd Pro model (1998, Oxford Materials Ltd, UK). It generally has a low average molecular weight, i.e., an average molecular weight of less than 75000. Preferably, the average molecular weight is in the range of 2000 to 75000. More preferably, the average molecular weight is between 5000 and 75000.

This PU chain is obtained by classical methods known in the art (see for example Polyurethanes Handbook 2$^{nd}$ edition, G. Oertel, 1994). The chains are notably obtained by the reaction of an isocyanate, an isocyanate-reactive compound (a polyol) and a chain extender.

For example, the suitable organic polyisocyanates for use in the process of the present invention include any of those known in the art for the preparation of polyurethanes, and in particular the aromatic polyisocyanates such as diphenyl-methane diisocyanate in the form of its 2,4'-, 2,2'-and 4,4'-isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2, although these are not preferred, toluene diisocyanate in the form of its 2,4-and 2,6-isomers and mixtures thereof, 1,5-naphthalene diisocyanate and 1,4-diisocyanatobenzene. Other organic polyisocyanates that may be mentioned include the aliphatic diisocyanates such as isophorone diisocyanate, 1,6-diisocyanatohexane and 4,4'-diisocyanatodicyclo-hexylmethane. Preferred are TDI or MDI, IPDI, HMDI and other aliphatic isocyanates. Most preferred is MDI, especially 4,4'-MDI. The functionality is preferably 2. Mixtures may be used.

Suitable isocyanate-reactive compounds to be used in the process of the present invention include any of those known in the art for the preparation of polyurethanes. Of particular importance are polyols and polyol mixtures having average hydroxyl numbers of from 20 to 300, especially from 25 to 150 mg KOH/g, and hydroxyl functionalities of from 1.5 to 3, especially from 1.8 to 2.2, and a MW generally from 750 to 6000. Suitable polyols have been fully described in the prior art and include reaction products of alkylene oxides, for example ethylene oxide and/or propylene oxide, with initiators containing from 2 to 8 active hydrogen atoms per molecule. Suitable initiators include: polyols, for example glycerol, trimethylolpropane, triethanolamine, pentaerythritol, sorbitol and sucrose; polyamines, for example ethylene diamine, tolylene diamine (TDA), diaminodiphenylmethane (DADPM) and polymethylene polyphenylene polyamines; and aminoalcohols, for example ethanolamine and diethanolamine; and mixtures of such initiators. Other suitable polymeric polyols include polyesters obtained by the condensation of appropriate proportions of glycols and higher functionality polyols with dicarboxylic or polycarboxylic acids. Still further suitable polymeric polyols include hydroxyl terminated polythioethers, polyamides, polyesteramides, polycarbonates, polyacetals, polyolefins and polysiloxanes. The isocyanate-reactive compound is preferably a polyol that is preferably a polyether or a polyester or mixtures thereof. Mixtures may be used.

A chain extender is classically used; it is traditionally a low molecular weight polyol, typically a diol. The MW generally ranges from 62 to 750; the functionality generally ranges from 1.9 to 2.1. Examples of suitable diols include ethylene glycol, diethylene glycol, butanediol, triethylene glycol, tripropylene glycol, 2-hydroxyethyl-2'-hydroxypropylether, 1,2-propylene glycol, 1,3-propylene glycol, Pripol® diol (Uniquema, Gouda, NL), dipropyl glycol, 1,2-, 1,3-and 1,4-butylene glycols, 1,5-pentane diol, bis-2-hydroxypropyl sulphide, bis-2-hydroxyalkyl carbonates, p-xylylene glycol, 4-hydroxymethyl-2,6-dimethyl phenol and 1,2-, 1,3-and 1,4-dihydroxy benzenes. PEG, PPG (e.g. 200) as well as PTHF (also known as PTMG) (e.g. 400) may also be used. Mixtures may be used.

Optional trifunctional chain extenders such as glycerol, trimethylolpropane and its alkoxylated derivatives may be used in combination with bifunctional chain extenders.

The quantities of the polyisocyanate compositions and the polyfunctional isocyanate-reactive compositions as well as those of the chain extender to be reacted (in the absence of end-cap monomer) will depend upon the nature of the polyurethane to be produced and will be readily determined by those skilled in the art. The isocyanate index can vary within broad limits, such as between 80 and 400.

H-Bonding Groups

According to the invention, the polymer chain PU bears the H-bonding groups X and Y, and optionally Z, which are identical or different.

Preferably, X and Y, identical, are the end groups of the polymer chain PU.

Generally, the H-bonding groups X and Y (and Z) have at least two sites capable of H-donor capability and at least two sites capable of H-acceptor capability (where these two sites may not be fully reacted).

The H-donor site may be a H-donor group well known by those skilled in the art. Such an H-donor group may comprise —NH—, —OH or —SH groups.

The H-acceptor site may be a H-acceptor site well known by those skilled in the art. Such an H-acceptor site may comprise atoms like O, N or S.

According to a preferred embodiment of the invention, X and Y (and Z) includes the group —NH—CO—NH—.

According to a highly preferred embodiment, X and Y are obtained by the reaction of a terminal isocyanate group with a compound of formula $H_2N-R_1R_2$, where $R_1$ and $R_2$ are each independently a C1-C6 alkyl or C3-C6 cycloalkyl group, or together can form a ring having one or two cycle(s), one or both of $R_1$ and $R_2$ being optionally interrupted by one or more heteroatom(s) selected from N, O and S.

The amine can be of formula $H_2N-C(R_3)=N-R_4$, where $R_3$ and $R_4$ are each independently a C1-C6 alkyl or C3-C6 cycloalkyl group, or together can form a ring having one or two cycle(s), one or both of $R_3$ and $R_4$ being optionally interrupted by one or more heteroatom(s) selected from N, O and S.

Preferably, at least one of $R_1$ and $R_2$ or $R_3$ and $R_4$ respectively is interrupted by one or more heteroatom(s).

Preferably, the amine is of formula:

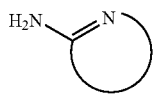

where the curve is a ring having one or two cycles, optionally interrupted by one or two heteroatoms selected from N, O and S.

The molecular weight is preferably below 400.

Preferably, the H-bonding site of the compound A reacting with the —NCO group is adjacent to the group that reacts with the —NCO group of the polymer.

The amine can be selected from the group consisting of 2-aminopyrimidine, isocytosine, 6-alkylisocytosine such as 6-methylisocytosine, 2-aminopyridine, 5-amino-uracil 6-tridecylisocytosine, 6-phenyl-isocytosine, 2-amino-6-(3-butenyl)-4-pyrimidone, p-di-(2-amino-6-ethyl-4-pyrimidone)benzene, 2-amino 4-pyridone, 4-pyrimidone 6-methyl-2-amino-4-pyrimidone, 6-ethyl-2-amino-4-pyrimidone, 6-phenyl-2-amino-4-pyrimidone, 6-(p-nitrophenyl)isocytosine, 6-(trifluoromethyl) isocytosine and their mixtures.

Examples of such compounds are 2-aminopyrimidine, 5-aminouracil, isocytosine and 6-alkylisocytosine such as 6-methylisocytosine.

The preferred amines are 2-aminopyrimidine and 6-alkylisocytosine such as 6-methylisocytosine.

The weight percentage of the groups X and Y based on the weight of the entire polymer of the invention generally ranges from 0.05 to 20% and preferably from 0.1 to 5%.

For example, one can cite as amine compounds the following compounds:

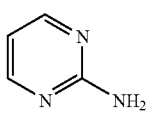
2-aminopyrimidine (AP): (formula)

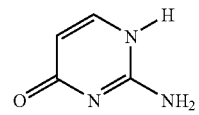
isocytosine : (formula)

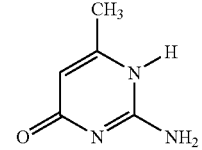
6-methylisocytosine (Melso) : (formula)

Process According to the Invention

The polymer of the invention may be prepared according to a process comprising the step of reacting a polymer comprising at least one polyurethane chain and at least two free —NCO groups with at least one compound A having at least one group able to react a —NCO group and at least one H-bonding site. This compound A is described above.

2-aminopyrimidine is one of the preferred reactants, since its melting point is quite low, about 125° C. This is interesting from a production viewpoint, because it allows to prepare the polymer of the invention at lower temperatures.

6-alkylisocytosine such as 6-methylisocytosine is one of the preferred reactants, because of the powerful effect, i.e. the resulting (supra)polymer exhibits high mechanical properties with low viscosities at melt.

A preferred process is one in which the polymers are obtained by reacting a polyisocyanate (1) with a functionality of 2, a polyol (2) having a MW from 750 to 6000 and a functionality from 1.8 to 2.2, a polyol (3) having a MW from 62 to 750 with a functionality of 1.9 to 2.5 and an amine compound (4) of formula $H_2N-C(R_3)=N-R_4$, where $R_3$ and $R_4$ are each independently a C1-C6 alkyl or C3-C6 cycloalkyl group, or together can form a ring having one or two cycle(s), all being optionally interrupted by one or more heteroatom(s) selected from N, O and S, with a MW less than 400 wherein the amount of isocyanate (1), polyol (2), polyol (3) and anine (4) is 10-50, 35-90, 1-30 and 0.5-20 by weight respectively per 100 parts by weight of isocyanate (1), polyol (2), polyol (3) and amine (4) wherein the reaction is conducted at an isocyanate index of 90 to 200, preferably 95 to 150, especially 98 to 102.

The above index also applies to any general process involving the reaction of polyisocyanate compositions, polyfunctional isocyanate-reactive compositions, chain extender and end-cap monomer (or compound A).

The polymers can be synthesised by either a solution or a bulk reaction process. In both cases, isocyanate (1), polyol (2), polyol (3) and amine (4) can be polymerised in a one-step process in the presence of a suitable catalyst in order to achieve the desired product. Alternatively, isocyanate (1) may be prepolymerized with polyol (2) and subsequently co-reacted with a blend of polyol (3) and amine (4) to obtain said product. This route of making polymers also allows producing polymers of the invention with high amounts of polyol (3). Such polymers are particularly useful in hot melt adhesive type applications. In order to accommodate this synthetic versatility without the occurrence of undesired covalent chain extension or cross-linking, dependent on the number of primary amine groups of amine (4), it is essential that amine (4) contains a single primary amine group. An amine with only one primary amine group allows controlling the polymer structure and polymer molecular weight precisely.

In a preferred embodiment, the polymer is obtained by bulk polymerisation of the components in the presence of mechanical shear, for example within the chambers of a Banbury® type mixer or twin-screw extruder. In the bulk polymerisation, it is preferred that the powdered amine (4) is milled to a suitably small particle size in order to facilitate rapid and efficient reaction.

Supramolecular Polymers of the Invention

Thanks to its H-bonding groups X and Y, the polymer of the invention has the ability to allow the formation of a supramolecular polymer at room temperature. This, in turn, allows better foaming at melt temperatures.

This is represented below, with isocytosine as an example. The dotted lines represent the H-bonds.

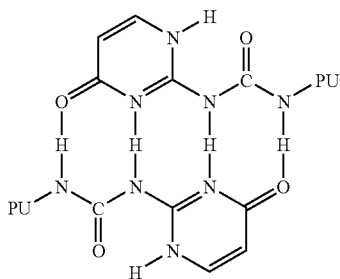

Therefore, an object of the invention is also a supramolecular polymer comprising units that form H-bridges with one another, and in which at least one of these units is a polymer according to the invention as described above.

The remaining units can be different units, for example, units as described in aforesaid International Patent Application No. WO 97/46607. Preferably, the units are the same.

In the polymer of the invention, the groups X and Y generate thermoreversible linear chain extension through H-bonding interactions.

Thus, the units have the capability to auto chain extend by chain-end interaction through H-bonding interaction.

Because the H bonds are thermoreversible, at low temperatures, the H-bond interaction is high and the supramolecular polymer has an apparent high molecular weight. At high temperatures, the H-bond interaction does not exist anymore or is low and the supramolecular polymer mainly decomposes into its monomeric units and behaves as a low molecular weight polymer.

In other words, when heated, the hydrogen bonds break and give a low viscosity material. Therefore, the supramolecular polymer has pseudo-high molecular weight properties at room temperature but low molecular weight properties at melt. It has been found that the efficiency of blowing agents is enhanced by such polymers.

Without wishing to be bound by theory, it is believed that the temperature at which the melting transition occurs in the polymers of the current invention is controlled by the design of the hard block. This transition temperature may be equal to or higher than the temperature at which the H-bonding interactions between the chain-ends are predominantly dissociated. Typically, the dissociation temperature of the end-group H-bonding interactions is greater than 80° C. and the hard block melting temperature is greater than 100° C. The ability to systematically control the melting temperature of the polymer through hard block design and the weight percentage of the hard block material in the polymer is an additional advantage of the polymers according to the present invention.

Any blowing agent or blowing agents combination can be used in the present invention. However, thermally expanding microspheres containing hydrocarbons, in particular aliphatic or cycloaliphatic hydrocarbons, are preferred. For the purpose of the present invention, the term "blowing agents" includes microspheres.

The term "hydrocarbon" as used herein is intended to include non-halogenated and partially or fully halogenated hydrocarbons.

Thermally expandable microspheres containing a (cyclo) aliphatic hydrocarbon, which are particularly preferred in the present invention, are commercially available. Such microspheres are generally dry, unexpanded or partially unexpanded microspheres consisting of small spherical particles with an average diameter of typically 10 to 15 micron. The sphere is formed of a gas proof polymeric shell (consisting e.g. of acrylonitrile or PVDC), encapsulating a minute drop of a (cyclo)aliphatic hydrocarbon, e.g. liquid isobutane. When these microspheres are subjected to heat at an elevated temperature level (e.g. 150° C. to 200° C.) sufficient to soften the thermoplastic shell and to volatilize the (cyclo)aliphatic hydrocarbon encapsulated therein, the resultant gas expands the shell and increases the volume of the microspheres. When expanded, the microspheres have a diameter 3.5 to 4 times their original diameter as a consequence of which their expanded volume is about 50 to 60 times greater than their initial volume in the unexpanded state. An example of such microspheres are the EXPANCEL DU microspheres which are marketed by AKZO Nobel Industries of Sweden (EXPANCEL is a trademark of AKZO Nobel Industries).

Any other known blowing agent used in the preparation of foamed thermoplastics may be used in the present invention as blowing agents.

Examples of suitable chemical blowing agents include gaseous compounds such as nitrogen or carbon dioxide, gas (e.g. $CO_2$) forming compounds such as azodicarbonamides, carbonates, bicarbonates, citrates, nitrates, borohydrides, carbides such as alkaline earth and alkali metal carbonates and bicarbonates e.g. sodium bicarbonate and sodium carbonate, ammonium carbonate, diaminodiphenylsulphone, hydrazides, malonic acid, citric acid, sodium monocitrate, ureas, azodicarbonic methyl ester, diazabicylooctane and acid/carbonate mixtures.

Examples of suitable physical blowing agents include volatile liquids such as chlorofluorocarbons, partially halogenated hydrocarbons or non-halogenated hydrocarbons like propane, n-butane, isobutane, n-pentane, isopentane and/or neopentane.

Blowing agents are usually used in amount of from 0.1 to 5.0 parts by weight per 100 parts by weight of supramolecular polymer. From 0.5 to 4.0 parts by weight per 100 parts by weight of supramolecular polymer of blowing agents are preferred. Most preferably, blowing agents are added in amounts from 1.0 to 3.0 parts by weight per 100 parts by weight of supramolecular polymer.

Additives that are conventionally used in thermoplastics processing may also be used in the process of the present invention. Such additives include catalysts, for example tertiary amines and tin compounds, surface-active agents and foam stabilizers, for example siloxane-oxyalkylene copolymers, flame retardants, antistatic agents, plasticizers, organic and inorganic fillers, pigments and internal mould release agents. The composition of the present invention allows to reduce such additives especially flow aids and plasticizers.

The foamed supramolecular polymers of the present invention can be made via a variety of processing techniques, such as extrusion, calendering, thermoforming, flow moulding or injection moulding. Injection moulding is however the preferred production method. The presence of reversible hydrogen bonds allows for a reduction in processing temperatures. Typically the process of the present invention is carried out at temperatures between 150 and 175° C.

Advantageously, the mould is pressurized, preferably with air, and the pressure is released during foaming. Although such process is known and commonly available from several machine producers, it has been surprisingly found that conducting the process of the present invention in a pressurized mould results in TPU articles having an excellent surface finish and physical properties, while having an even further reduced density (down to 350 kg/m$^3$).

Thermoplastic polyurethanes of any density between about 100 and 1200 kg/m$^3$ can be prepared by the method of this invention, but it is primarily of use for preparing foamed thermoplastic polyurethanes having densities of less than 800 kg/m$^3$, more preferably less than 700 kg/m$^3$ and most preferably less than 600 kg/m$^3$.

The thermoplastic polyurethane is customarily manufactured as pellets for later processing into the desired article. The term 'pellets' is understood and used herein to encompass various geometric forms, such as squares, trapezoids, cylinders, lenticular shapes, cylinders with diagonal faces, chunks, and substantially spherical shapes including a particle of powder or a larger-size sphere. While thermoplastic polymers are often sold as pellets, the supramolecular polymer could be in any shape or size suitable for use in the equipment used to form the final article.

According to another embodiment of the present invention, the supramolecular polymer pellet of the present invention comprises a supramolecular polymer body, the blowing agent composition and a binding agent, which binds the body, and the blowing agents. The binding agent comprises a polymeric component that has an onset temperature for its melt processing lower than the onset temperature of the melt processing range of the supramolecular polymer. The pellets may also include blowing agents and/or additive components such as colorant or pigments.

The binding agent covers at least part of the supramolecular polymer body. In a preferred embodiment, the supramolecular polymer body and blowing agents are substantially encapsulated by the binding agent. By 'substantially encapsulated' we mean that at least three-quarters of the surface of the supramolecular polymer body is coated, and preferably at least about nine-tenths of the resin body is coated. It is particularly preferred for the binding agent to cover substantially all of the supramolecular polymer body and blowing agents. The amount of binding agent to the supramolecular polymer may typically range from at least about 0.1% by weight and up to about 10% by weight, based on the weight of the supramolecular polymer pellet. Preferably, the amount of the binding agent is at least about 0.5% by weight and up to 5% by weight, based on the weight of the supramolecular polymer pellet.

Preferably, the binding agent has an onset temperature for its melt processing range that is below the onset temperature of the melt processing range of the supramolecular polymer body. Thus, the binding agent may be applied as a melt to the supramolecular polymer body composition while the latter is a solid or substantially a solid. The onset temperature of the melt processing range to the binding agent is preferably above about 20 degree C., and more preferably it is above 60 degree C., and even more preferably it is at least about 80 degree C.

The onset temperature of the melt processing range of the polymeric component of the coating preferably has an onset temperature for its melt processing range at least about 20 degree C. and even more preferably at least about 40 degree C. below, the onset temperature for the melt processing range of the supramolecular polymer body. If the customized supramolecular polymer pellets are to be dried using a dryer, then the melt processing range of the binding agent is preferably above the temperature of the dryer. In a preferred embodiment, the binding agent is chosen to prevent or slow water absorption so that a drying step before forming the desired article is unnecessary.

The binding agent may then be added to the supramolecular polymer pellets by several different methods. In one method, the pellets are placed in a container with the coating composition while the pellets are still at a temperature above the onset temperature of the melt processing range of the binding agent. In this case the binding agent may be already melted or may be melted by the heat of the pellets or by heat applied externally to the container. For example, without limitation, the binding agent may be introduced to the container as a powder when it is to be melted in the container. The binding agent can be any substance capable of binding the supramolecular polymer body and the blowing agents. Preferably the binding agent comprises a polymeric component. Examples of suitable polymeric components include polyisocyanates and/or prepolymers thereof.

The foamed supramolecular polymers obtainable via the process of the present invention are particularly suitable for use in any application of thermoplastic rubbers including, for example, footwear or integral skin applications like steering wheels.

Customized supramolecular polymers may be produced more efficiently using the process according to the present invention. The customized supramolecular polymers may be formed into any of the articles generally made with thermoplastic resins. Examples of articles are interior and exterior parts of automobiles, such as inside panels, bumpers, housing of electric devices such as television, personal computers, telephones, video cameras, watches, note-book personal computers; packaging materials; leisure goods; sporting goods and toys.

In another embodiment, the present invention concerns a reaction system comprising (a) a supramolecular polymer and (b) a blowing agent.

The invention is illustrated, but not limited, by the following example in which all parts, percentages and ratios are by weight.

EXAMPLE

Supramolecular polymer pellets of formulation 1 were prepared by feeding the reactants in a twin screw extruder, connected to an underwater pelletizer. The isocyanate component was fed via a separate line whereas all isocyanate reactive chemicals were premixed.

Formulation 1 was:

| | |
|---|---|
| Suprasec ® 1306 isocyanate (4,4'-MDI w/less than 2% of the 2,4'-MDI isomer) | 23.98% |
| Daltorez ® P765 polyester | 69.83% |
| 1,4-butanediol | 5.50% |
| 6-methylisocytosine (micronized) | 0.69% |

Daltorez® P765 polyester is a polyester made by the reaction of adipic acid with a 50/50 by weight blend of ethylene glycol and 1,4-butanediol, up to a molecular weight of 2240.

The reactive extruder was heated with a temperature profile going from 230° C. to 170° C. The screw speed was set-up to ensure a minimum residence time of 1 minute. 0.025% of bismuth neodecanoate was added to speed up the reaction.

The pellets so obtained were post-cured during 16 hours in a dryer at 80° C. The pellets were then preheated to 100° C. 0.35 pbw of a binding agent consisting of an isocyanate prepolymer based on hexylene adipate and Suprasec MPR isocyanate, and 2 pbw of Expancel 093 DU 120 microspheres (thermally expandable microspheres) were added and applied homogeneously by stirring with a mechanical stirrer.

The coated pellets so obtained were fed into a Main Group Polaris injection molding machine, and injected at a temperature of 168° C. in a 310 mm×115 mm×14 mm mold. A foamed slab of a density of 0.55 kg/m³ was thus obtained having good properties in terms of Teer, Hardness Shore A, Tensile strength, Elongation at break Similar results can be obtained by the blowing agents or mixtures thereof such as defined in the description.

What is claimed:

1. A process for the preparation of foamed supramolecular polymers characterized in that the foaming of the supramolecular polymer is carried out in the presence of a blowing agent, wherein the supramolecular polymer has the following general formula:

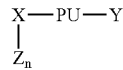

where

PU is a polymer chain comprising at least one polyurethane chain; and n ranges from 0 to 8;

X, Y and Z, identical or different are H-bonding sites, wherein X and Y are obtained by the reaction of a terminal isocyanate group with a compound selected from the group consisting of 2-aminopyrimidine, isocytosine, 6-alkylisocytosine, 2-aminopyridine, 5-amino-uracil 6-tridecylisocytosine, 6-phenyl-isocytosine, 2-amino-6-(3-butenyl)-4-pyrimidone, p-di-(2-amino-6-ethyl-4-pyrimidone) benzene, 2-amino 4-pyridone, 4-pyrimidone 6-methyl-2-amino-4-pyrimidone, 6-ethyl-2-amino-4-pyrimidone, 6-phenyl-2-amino-4-pyrimidone, 6-(p-nitrophenyl)isocytosine, 6-(trifluoromethyl) isocytosine and their mixtures.

2. The process according to claim 1 wherein the blowing agent is selected from the group consisting of a thermally expandable microsphere, an endothermic blowing agent, an exothermic blowing agent, and mixtures thereof.

3. The process according to claim 2 wherein the endothermic blowing agent comprises bicarbonate or citrates.

4. The process according to claim 2 wherein the exothermic blowing agent comprises azodicarbonamide type compounds.

5. The process according claim 1 which is carried out by injection moulding.

6. The process according to claim 2 which is carried out by injection moulding.

7. The process according to claim 2 wherein the amount of microspheres is between 0.5 and 4.0 parts by weight per 100 parts by weight of the supramolecular polymer.

8. The process according to claim 6 wherein the amount of microspheres is between 0.5 and 4.0 parts by weight per 100 parts by weight of the supramolecular polymer.

9. The process according to claim 1, wherein X and Y are obtained by the reaction of a terminal isocyanate group with 2-aminopyrimidine or 6-alkylisocytosine.

* * * * *